United States Patent
Sarafianos et al.

(10) Patent No.: US 10,878,132 B2
(45) Date of Patent: Dec. 29, 2020

(54) LOGIC DEVICE FOR DETECTING FAULTS

(71) Applicant: STMicroelectronics (Rousset) SAS, Rousset (FR)

(72) Inventors: Alexandre Sarafianos, Pourrieres (FR); Thomas Ordas, Pourcieux (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 204 days.

(21) Appl. No.: 15/920,835

(22) Filed: Mar. 14, 2018

(65) Prior Publication Data
US 2018/0341788 A1 Nov. 29, 2018

(30) Foreign Application Priority Data

May 24, 2017 (FR) .................................... 17 54607

(51) Int. Cl.
| | |
|---|---|
| G06F 21/76 | (2013.01) |
| H04L 9/00 | (2006.01) |
| G09C 1/00 | (2006.01) |
| G11C 19/28 | (2006.01) |
| H03K 19/003 | (2006.01) |
| H03K 19/20 | (2006.01) |
| H03K 19/21 | (2006.01) |

(52) U.S. Cl.
CPC ............... G06F 21/76 (2013.01); G09C 1/00 (2013.01); G11C 19/28 (2013.01); H03K 19/003 (2013.01); H03K 19/20 (2013.01); H03K 19/21 (2013.01); H04L 9/004 (2013.01)

(58) Field of Classification Search
CPC ....................................................... G06F 21/76
USPC ........................................ 714/720, 722, 718
See application file for complete search history.

(56) References Cited

U.S. PATENT DOCUMENTS

| | | | | |
|---|---|---|---|---|
| 3,821,717 | A * | 6/1974 | McKenny | G11C 11/405 365/149 |
| 4,506,259 | A * | 3/1985 | Rhodes | G01R 31/50 340/640 |
| 4,903,266 | A * | 2/1990 | Hack | G11C 29/20 708/252 |
| 2008/0059850 | A1* | 3/2008 | Bahl | G06F 11/27 714/718 |
| 2009/0063917 | A1* | 3/2009 | Tokunaga | G11C 29/44 714/719 |
| 2013/0113572 | A1 | 5/2013 | Sharda et al. | |
| 2014/0304467 | A1* | 10/2014 | Pickett | G11C 7/1012 711/109 |

(Continued)

FOREIGN PATENT DOCUMENTS

EP   0648017 A1   4/1995

OTHER PUBLICATIONS

IBM Technical Disclosure Bulletin: Error Checking Applied to Integration Detection (May 1970); Data : USA; vol. No. 12; Issue :12; p. No. 2349-2352, Publication Date May 1, 1970 (Year: 1970).*

(Continued)

Primary Examiner — Fritz Alphonse
(74) Attorney, Agent, or Firm — Slater Matsil, LLP

(57) ABSTRACT

A device can be used for detecting faults. A shift register is suitable for shifting, in tempo with a clock, a binary signal alternating between two logic levels, in successive cells of the shift register. A first logic circuit is suitable for comparing values contained in at least one pair of cells of the register.

21 Claims, 3 Drawing Sheets

(56) References Cited

U.S. PATENT DOCUMENTS

2015/0205325 A1* 7/2015 Nomura ................. G06F 1/324
　　　　　　　　　　　　　　　　　　　　　　　713/300

OTHER PUBLICATIONS

Breier, Jakub et al., "An Electromagnetic Fault Injection Sensor using Hogge Phase-Detector", IEEE 18th International Symposium on Quality Electronic Design, Mar. 14-15, 2017, 6 pages.

* cited by examiner

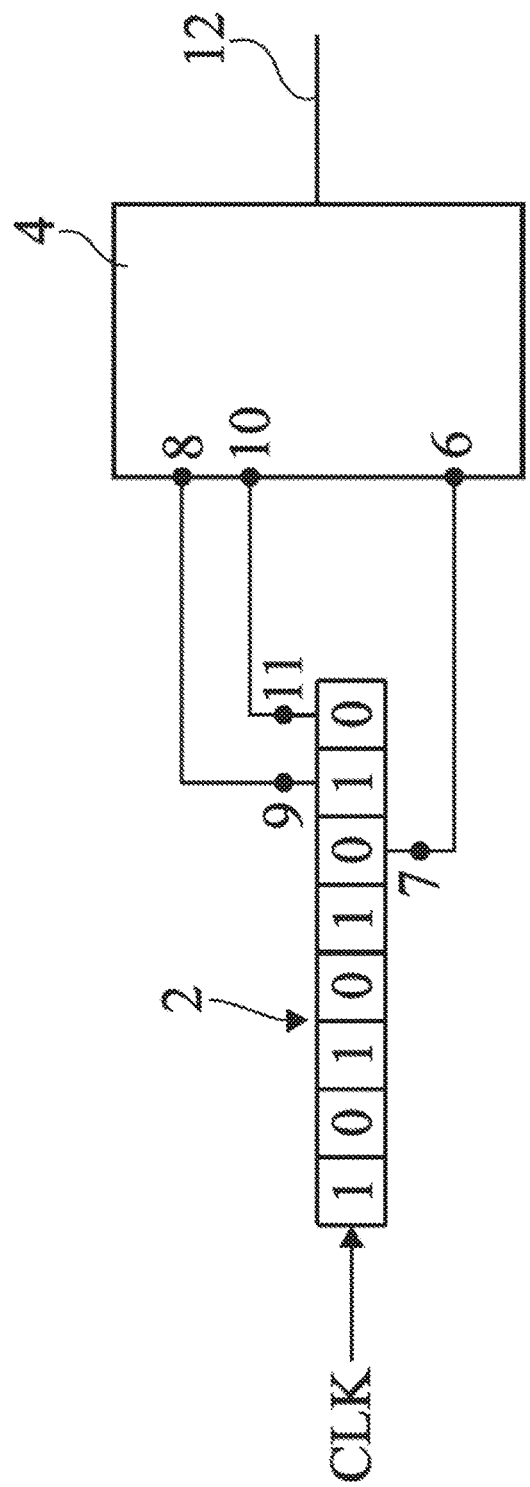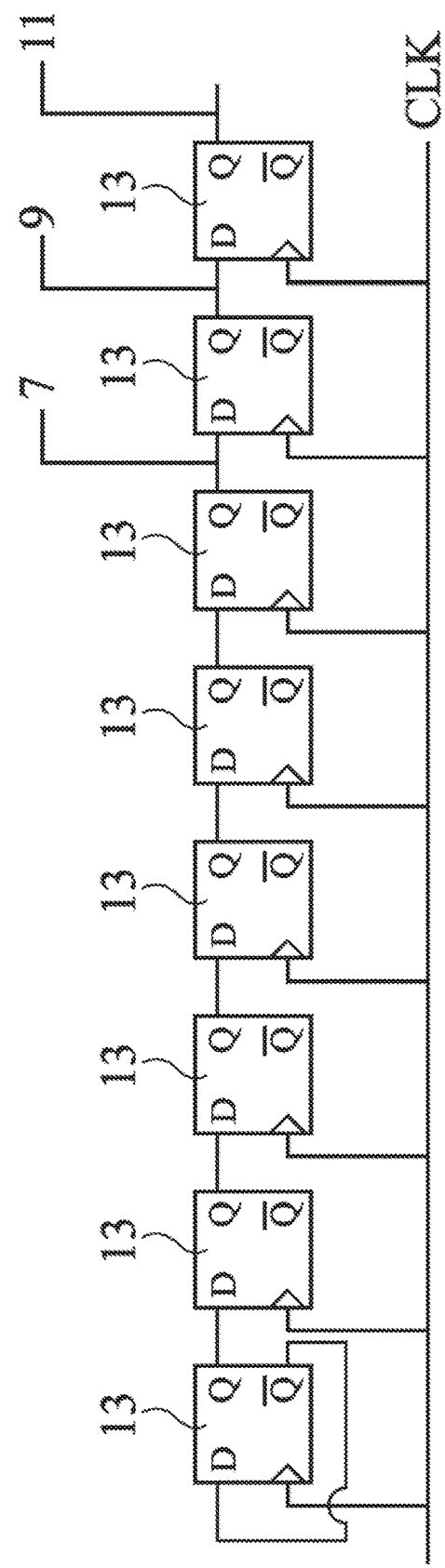
FIG. 1
FIG. 2

LOGIC DEVICE FOR DETECTING FAULTS

CROSS-REFERENCE TO RELATED APPLICATIONS

This application claims priority to French Application No. 1754607, filed on May 24, 2017, which application is hereby incorporated herein by reference.

TECHNICAL FIELD

The present patent application relates to electronic chips and, in particular embodiments, to electronic chips protected against the injection of faults.

BACKGROUND

Electronic chips containing confidential information, such as bank card chips, are liable to undergo attacks aimed at determining the manner of operation of the chip and at extracting the confidential information therefrom.

A prevalent method for hacking into information handled by integrated circuits consists in detecting the zones of the circuit that are used when processing this information. Accordingly, the integrated circuit is activated or placed in a functional environment and data are introduced as input. While the data are being processed, defects, or faults, are injected into the circuit, for example, by a laser, by an electromagnetic signal or by local application of high voltages. An analysis of the outputs of the circuit makes it possible to determine the zones of the circuit that process the data. After having located these zones, the hacker can concentrate their attacks on these zones so as to determine the confidential data that are processed.

If such an attack is detected, a counter-measure can be triggered. This counter-measure is for example the erasure of the confidential information, the resetting to zero of the circuit and/or the incrementing of a counter, making it possible to definitively disable the integrated circuit once a certain number of faults have been detected.

It would be desirable to provide a chip that can detect these types of attacks.

SUMMARY

One embodiment provides a device for detecting faults including a shift register suitable for shifting, in tempo with a clock, a binary signal alternating between two logic levels, in successive cells of the shift register; and a first logic circuit suitable for comparing values contained in at least one pair of cells of the register.

According to one embodiment, the first logic circuit is suitable for comparing the values contained in three successive cells connected to first, second and third inputs and is suitable for comparing a value received in first input with a value received in second input, and for comparing a value received in second input with a value received in third input.

According to one embodiment, a last of the successive cells of the register is connected to the third input of the first logic circuit, a last-but-one cell of the register is connected to the second input of the first logic circuit and an antepenultimate cell of the register is connected to the first input of the first logic circuit.

According to one embodiment, the first logic circuit includes two Exclusive OR gates, one having inputs constituting the first and second inputs of the logic circuit and the other having an input connected to the second input of the logic circuit and an input constituting the third input of the logic circuit; and a second logic circuit suitable for providing a first value if the outputs of the two Exclusive OR gates have a value equal to a low logic level and a second value in the other cases.

According to one embodiment, the second logic circuit includes two inverters, each having an input connected to the output of one of the Exclusive OR gates; and an OR gate whose inputs are connected to the outputs of the two inverters, the output of the OR gate corresponding to the output of the first logic circuit.

According to one embodiment, the second logic circuit includes an AND gate whose inputs are connected to the outputs of the Exclusive OR gates, the output of the AND gate corresponding to the output of the first logic circuit.

According to one embodiment, the shift register is composed of D-type flip-flops connected to one and the same first clock signal, an output of each flip-flop other than a last flip-flop of the register being connected to the D input of the following flip-flop. Other embodiments may use a different type of flip-flop, such as, for example, a toggle flip-flop.

According to one embodiment, a complementary output of a first flip-flop of the register is connected to its D input.

According to one embodiment, the D input of a first flip-flop of the register is connected to a second clock signal of frequency equal to half that of the first clock signal.

According to one embodiment, the frequency of the first clock signal is between 50 and 100 MHz. Other frequencies are also possible.

According to one embodiment, the shift register is a ring register.

One embodiment provides an electronic chip including a plurality of devices such as hereinabove for detecting faults. In some embodiments, the electronic chip may be implemented in a single monolithic semiconductor substrate.

According to one embodiment, the devices for detecting faults occupy between 3 and 10% of the area of the chip.

According to one embodiment, the device detects faults injected using a laser, an electromagnetic signal or local application of a high voltage (e.g., at least twice the normal operating voltage) to the device.

BRIEF DESCRIPTION OF THE DRAWINGS

These characteristics and advantages, as well as others, will be set forth in detail in the following non-limiting description of particular embodiments, given in conjunction with the attached figures among which:

FIG. 1 schematically illustrates an embodiment of a logic device for detecting faults;

FIG. 2 illustrates an exemplary register;

DETAILED DESCRIPTION OF ILLUSTRATIVE EMBODIMENTS

Figure 3:
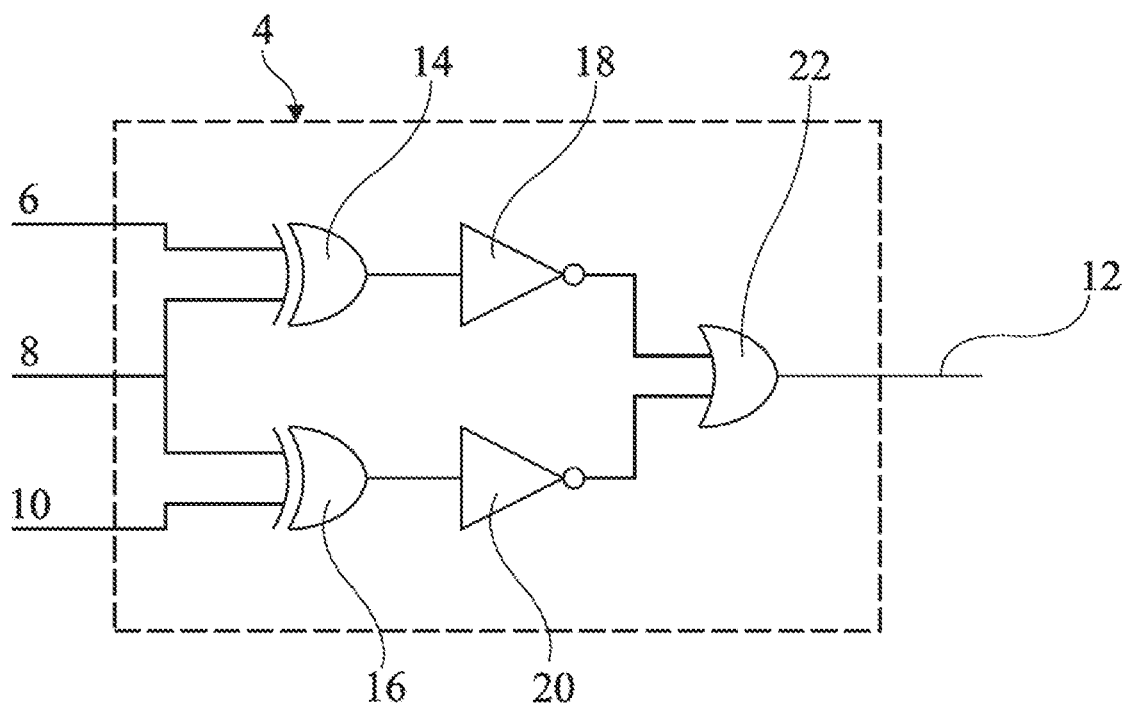
FIG. 3 illustrates an example of a comparator used in the device of FIG. 1.

Like elements have been designated by like references in the various figures and, moreover, the diverse figures are not drawn to scale. For the sake of clarity, only the elements useful to the understanding of the embodiments described have been represented and are detailed.

Unless specified to the contrary, the expressions "approximately" and "of the order of" signify to within 10%, preferably to within 5%.

FIG. 1 schematically illustrates an embodiment of a logic device for detecting faults. The device includes a shift register 2 and a comparison logic circuit 4.

The exemplary shift register 2 illustrated in FIG. 1, and described in greater detail hereinafter in conjunction with FIG. 2, includes 8 cells. The register 2 customarily includes 8, 16, 32 or 64 cells. Shift registers having a different number of cells are also possible. The cells of the shift register 2 contain bits whose values are configured to alternate between a low logic level "0" and a high logic level "1." The register 2 is associated with a clock signal CLK.

In tempo with (i.e., at the same frequency as or synchronized with) the signal CLK, for example at each rising edge, the value contained in each cell is shifted into the following cell, the content of the first cell taking, at each clock tick, the opposite value of its previous value.

At the instant illustrated by FIG. 1, the values contained in the cells of the register 2 are "10101010." At the following rising edge of the clock signal, the values contained in the cells of the register become "01010101."

The circuit 4 is a comparison logic circuit suitable for verifying that successive cells of the register 2 do indeed contain alternated values and have not been modified by an injection of faults.

In the example of FIG. 1, the circuit 4 has three inputs 6, 8 and 10 linked to respective outputs 7, 9 and 11 of the register, and an output 12. The circuit 4 compares the values of the inputs 6 and 8 on the one hand, and of the inputs 8 and 10 on the other hand. The inputs of the circuit 4 are connected to the outputs of the last three cells of the register 2. More precisely, the input 10 is connected to the output 11 of the last cell of the register, the input 8 to the output 9 of the last-but-one cell and the input 6 to the output 7 of the antepenultimate cell.

The value of the output 12 of the circuit 4 is equal to a first value, for example 0, if the values contained in the last three cells alternate between the values 0 and 1, that is to say if the values contained in these three cells are "1, 0, 1" or "0, 1, 0."

During an attack such as that described previously, faults are injected, and the values of one or more cells of the register may then be modified. The values contained in several successive cells are therefore identical. As the register constantly shifts the values contained in its cells, the faults reach the inputs of the circuit 4. The value of the output 12 of the circuit 4 then takes a second value, for example 1.

For example, if the values contained in the cells of the register are those illustrated by FIG. 1, an insertion of faults may change the value contained in the third cell from 1 to 0. The values contained in the cells of the register are therefore "10001010." After three rising edges of the clock CLK, the values contained in the cells of the register have been shifted and are then "01010001." The inputs 6, 8 and 10 of the circuit 4 are therefore respectively 0, 0 and 1. Two successive values are equal. The output of the circuit 4 takes the second value, signifying the detection of a fault.

The frequency of the clock signal CLK is preferably the highest possible frequency compatible with the system into which the device described here for selecting faults is inserted. This frequency can be lower than 100 MHz, for example, between 50 and 100 MHz. Thus, a fault in the register very rapidly reaches the cells of the register whose values are dispatched to the circuit 4.

By way of variant, the comparison circuit 4 may compare a different number of values contained in cells of the register 2. For example, the circuit may compare only the values contained in the last two cells of the register, or on the last four cell of the register. Other implementations are also possible.

By way of variant, the circuit 4 may compare the value contained in the last cell with the value of any other cell of the register. For example, in the case of a register with eight cells, the circuit 4 may compare the value contained in the eighth and last cell with the value contained in the third cell, which ought to be different, or with the value contained in the second cell, which ought to be identical.

Increasing the number of pairs of values to be compared at a given instant renders fault detection faster, but the device then occupies a more sizable area.

By way of variant, the shift register may be a ring register that has been initialized in such a way that each cell contains a different value from the values contained in the preceding cell and in the following cell. At each tick of the clock CLK, the values contained in the cells of the register are shifted one cell, the value contained in the last cell being shifted to the first cell.

In the case of a ring register, the cells connected at input of the circuit 4 might not be the last cells of the register and may be situated at any level of the register. For example, in the case of a register with eight cells, the three cells connected to the input of the circuit 4 may be second, third and fourth cells.

FIG. 2 illustrates an exemplary eight-cell register 2 formed by eight D-type flip-flops 13.

Each flip-flop 13 has two inputs, a D input receiving a data item in the form of a binary signal and an input receiving a clock signal CLK. A flip-flop 13 also has two complementary Q and $\overline{Q}$ binary outputs. At each rising edge of the clock signal, the Q output takes the value of the D input and the value of the $\overline{Q}$ output takes the complementary value of the value of the D input.

The register 2 is formed of eight flip-flops 13 connected to one and the same clock signal CLK. The D input of each flip-flop 13 is connected to the Q output of the previous flip-flop, with the exception of the first flip-flop whose D input is connected to its $\overline{Q}$ output. The values of the Q output of the first flip-flop 13 alternate between 0 and 1 at each rising edge of the clock signal.

In the example of FIG. 2, the Q outputs of the last three flip-flops of the register constitute the outputs 7, 9 and 11 of the register.

By way of variant, the D input of the first flip-flop may receive a clock signal whose frequency is half the frequency of the clock signal CLK.

FIG. 3 illustrates an exemplary circuit 4 having inputs 6, 8 and 10 and an output 12.

Here, the circuit 4 includes two Exclusive OR, or XOR, gates 14 and 16. The inputs of the XOR gate 14 correspond to the inputs 6 and 8 of the circuit 4 and the inputs of the XOR gate 16 correspond to the inputs 8 and 10 of the circuit 4. The output of each XOR gate 14 and 16 is connected to the input of an inverter. More precisely, the output of the gate 14 is connected to the input of the inverter 18 and the output of the gate 16 is connected to the input of the inverter 20. The outputs of the two inverters 18 and 20 are connected to the inputs of an OR gate 22. The output of the OR gate 22 constitutes the output 12 of the circuit 4.

The output 12 of the circuit 4 equals 0 if the inputs 6, 8 and 10 equal "0, 1, 0" or "1, 0, 1" and equals 1 in the other cases. The value 1 at the output of the circuit 4 corresponds to the detection of a fault.

Figure 4:
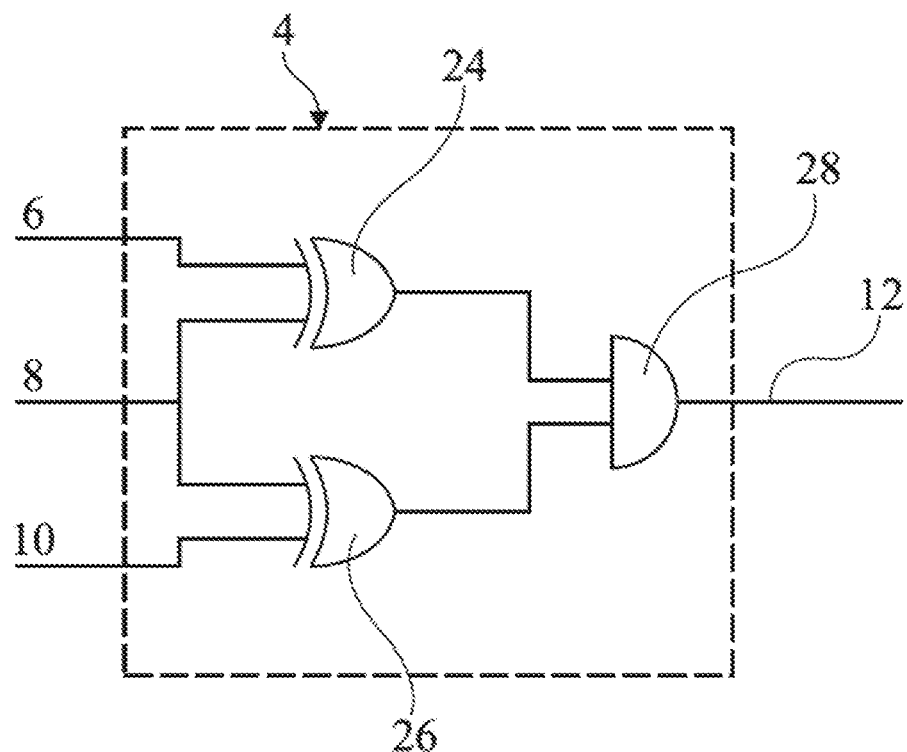
FIG. 4 illustrates another example of a comparator used in the device of FIG. 1.

FIG. 4 illustrates another exemplary circuit 4 having inputs 6, 8 and 10 and an output 12.

Here the circuit 4 includes two Exclusive OR, or XOR, gates 24 and 26. The inputs of the XOR gate 24 correspond to the inputs 6 and 8 of the circuit 4 and the inputs of the XOR gate 26 correspond to the inputs 8 and 10 of the circuit 4. The outputs of the XOR gates 24 and 26 are connected to the inputs of an AND gate 28. The output of the AND gate 28 constitutes the output 12 of the circuit 4.

The output 12 of the circuit 4 equals 1 if the inputs 6, 8 and 10 equal "0, 1, 0" or "1, 0, 1" and equals 0 in the other cases. The value 0 at the output of the circuit 4 corresponds to the detection of a fault.

Figure 5:
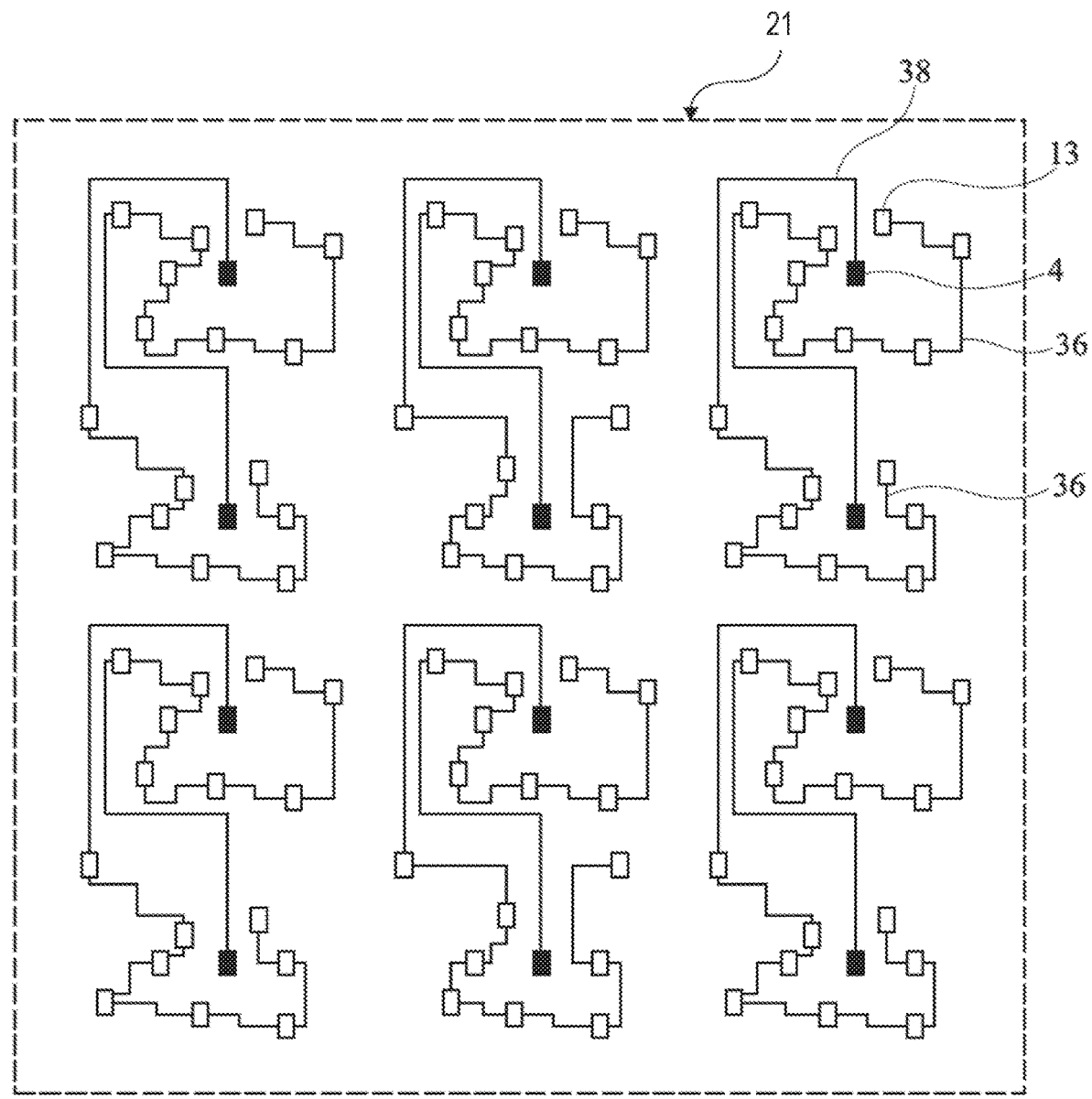
FIG. 5 represents an exemplary placement of the device of FIG. 1 on a chip.

FIG. 5 represents a portion 21 of a chip composed of a multitude of blocks of logic components, not represented. Fault detection devices such as that described in conjunction with FIG. 1 are inserted between these blocks of logic components. Six identical structures each comprising two devices for detecting faults are represented.

Each device includes a logic circuit 4, represented by a dark rectangle, and a register with eight cells, each cell being represented by a clear rectangle. For example, each cell is a D-type flip-flop 13. More precisely, each flip-flop 13 and each circuit 4 is composed of several transistors formed in the portion 21.

Each circuit 4 and the corresponding flip-flops 13 are connected by a connection 36. The flip-flops 13 are linked in series by the connections 36. The connections of the circuit 4 to the outputs of the three successive flip-flops 13 are represented only in part. More precisely, only the connection 38 between the circuit 4 and the last cell of the register is represented.

Diverse other components, not represented, are formed around the devices for detecting faults. The devices for detecting faults represent for example between 3 and 10% of the area of the chip, for example approximately 5%. The devices for detecting faults are distributed over the whole set of logic zones of the chip in such a way that fault injection attacks can be pinpointed over the whole of the chip.

Increasing the number of cells in the register, that is to say the number of flip-flops, makes it possible to increase the area protected by a single circuit.

An advantage of the device for detecting faults such as it has been described here is that it is entirely digital and easy to implement on any type of chip. Moreover, such a device consumes little energy and is difficult to pinpoint.

Particular embodiments have been described. Diverse variants and modifications will be apparent to the person skilled in the art. In particular, the circuit 4 and the register 2 are not limited to the examples described in conjunction with FIGS. 2, 3 and 4 and can be replaced with any other circuit and register having the same characteristics.

What is claimed is:

1. A device for detecting faults, the device comprising:
a shift register configured to shift a binary signal alternating between two logic levels in successive cells of the shift register, the shifting being done synchronously with a clock; and
a first logic circuit configured to compare values contained in one pair of cells of the shift register, wherein the device is configured to detect a fault injection and wherein the first logic circuit is configured to assert an output of the first logic circuit when the fault injection is detected, wherein each cell of the shift register has an input coupled to an output of a cell of the shift register.

2. The device of claim 1, wherein the shift register is a ring register.

3. The device of claim 1, wherein the fault injection comprises injecting the fault with a laser, an electromagnetic signal or local application of high voltages to the device.

4. A device for detecting faults, the device comprising:
a shift register configured to shift a binary signal alternating between two logic levels in successive cells of the shift register, the shifting being done synchronously with a clock; and
a first logic circuit configured to compare values contained in one pair of cells of the shift register, wherein the first logic circuit is configured to compare values contained in three successive cells connected to a first, second and third inputs of the first logic circuit, wherein the three successive cells comprise the one pair of cells, and wherein comparing values contained in three successive cells comprises:
comparing a value received in the first input of the first logic circuit with a value received in the second input of the first logic circuit, and
comparing a value received in the second input of the first logic circuit with a value received in the third input of the first logic circuit.

5. The device of claim 4, wherein a last cell of the successive cells of the shift register is connected to the third input of the first logic circuit, a last-but-one cell of the shift register is connected to the second input of the first logic circuit and an antepenultimate cell of the shift register is connected to the first input of the first logic circuit.

6. The device of claim 5, wherein the first logic circuit comprises:
a first Exclusive OR gate having a first input coupled to the first input of the first logic circuit, a second input coupled to the second input of the first logic circuit and an output;
a second Exclusive OR gate having a first input coupled to the second input of the first logic circuit, a second input coupled to the third input of the first logic circuit, and an output; and
a second logic circuit configured to provide a first value when the outputs of the first and second Exclusive OR gates have a value equal to a low logic level and a second value when the output of one of the of the first and second Exclusive OR gates has a value equal to a high logic level.

7. The device of claim 6, wherein the second logic circuit comprises:
a first inverter having an input coupled to the output of the first Exclusive OR gate;
a second inverter having an input coupled to the output of the second Exclusive OR gate; and
an OR gate having a first input coupled to an output of the first inverter, a second input coupled to an output of the second inverter, and an output coupled to an output of the first logic circuit.

8. The device of claim 6, wherein the second logic circuit comprises an AND gate having a first input coupled to the output of the first Exclusive OR gate, a second input coupled to the output of the second Exclusive OR gate, and an output coupled to an output of the first logic circuit.

9. A device for detecting faults, the device comprising:
a shift register configured to shift a binary signal alternating between two logic levels in successive cells of the shift register, the shifting being done synchronously with a clock; and
a first logic circuit configured to compare values contained in one pair of cells of the shift register, wherein the shift register comprises a plurality of D-type flip-flops, wherein each of the plurality of D-type flip-flops comprises a clock input coupled to a clock terminal, the clock terminal configured to receive a first clock signal, wherein an output of each flip-flop other than a last flip-flop of the shift register is coupled to a D input of a following flip-flop, and wherein a complementary output of a first flip-flop of the shift register is coupled to the D input of the first flip-flop.

10. The device of claim 9, wherein the D input of a first flip-flop of the shift register is coupled to a second clock signal of frequency equal to half of the first clock signal.

11. The device of claim 9, wherein a frequency of the first clock signal is between 50 and 100 MHz.

12. A device for detecting faults, the device comprising:
a shift register configured to shift a binary signal alternating between two logic levels in successive cells of the shift register, the shifting being done synchronously with a clock; and
a first logic circuit configured to compare values contained in one pair of cells of the shift register, wherein the one pair of cells of the shift register comprises two non-sequential cells of the shift register.

13. A method of detection of fault injection, the method comprising:
shifting, in synchronization with a clock, a binary signal alternating between two logic levels in a shift register of a device, wherein the shift register comprises a plurality of D-type flip-flops, wherein each of the plurality of D-type flip-flops comprises a clock input coupled to a clock terminal, the clock terminal configured to receive a first clock signal, wherein an output of each flip-flop other than a last flip-flop of the shift register is coupled to a D input of a following flip-flop, and wherein a complementary output of a first flip-flop of the shift register is coupled to the D input of the first flip-flop;
comparing, with a first logic circuit, a first value of a first cell of the shift register with a second value of a second cell of the shift register;
determining whether or not a fault has been injected into the device based on the comparison; and
generating a fault signal, with the first logic circuit, based on determining that a fault has been injected into the device, the fault signal not being generated when no fault has been injected into the device.

14. The method of claim 13, further comprising:
receiving, by the device, a laser beam, an electromagnetic signal or a high voltage; and
determining that the fault has been injected after receiving the laser beam, electromagnetic signal or high voltage.

15. The method of claim 13, wherein the clock operates at a frequency lower than 100 MHz.

16. An electronic chip comprising a substrate, and a plurality of fault detection devices disposed in the substrate, wherein each of the plurality of fault detection devices comprises:
a shift register configured to shift, in tempo with a clock, a binary signal alternating between two logic levels in successive cells of the shift register; and
a logic circuit configured to compare values contained in one pair of cells of the shift register.

17. The electronic chip of claim 16, wherein the plurality of fault detection devices occupies between 3% and 10% of an area of the electronic chip.

18. The electronic chip of claim 16, wherein each device of the plurality of fault detection devices has an identical layout to another device of the plurality of fault detection devices.

19. The electronic chip of claim 16, wherein the logic circuit of a first device of the plurality of fault detection devices is at least partially surrounded by the shift register of a second device of the plurality of fault detection devices.

20. The electronic chip of claim 16, wherein the logic circuit of a first device of the plurality of fault detection devices comprises:
a first Exclusive OR gate having a first input coupled to a first input of a first logic circuit, a second input coupled to a second input of the first logic circuit and an output;
a second Exclusive OR gate having a first input coupled to the second input of the first logic circuit, a second input coupled to a third input of the first logic circuit, and an output; and
a second logic circuit configured to provide a first value when the outputs of the first and second Exclusive OR gates have a value equal to a low logic level and a second value when the output of one of the of the first and second Exclusive OR gates has a value equal to a high logic level.

21. The electronic chip of claim 16, wherein each cell of the shift register has an input coupled to an output of a cell of the shift register.

* * * * *